US010083772B2

(12) United States Patent
MacLaughlin

(10) Patent No.: US 10,083,772 B2
(45) Date of Patent: Sep. 25, 2018

(54) ALIGNED CARBON NANOTUBES FOR IMPROVED X-RAY DETECTOR PERFORMANCE

(71) Applicant: CARESTREAM HEALTH, INC., Rochester, NY (US)

(72) Inventor: Scott T. MacLaughlin, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 15/632,576

(22) Filed: Jun. 26, 2017

(65) Prior Publication Data

US 2017/0294247 A1  Oct. 12, 2017

Related U.S. Application Data

(63) Continuation-in-part of application No. 14/811,871, filed on Jul. 29, 2015, now Pat. No. 9,720,103.

(51) Int. Cl.

| | | |
|---|---|---|
| *G01T 7/00* | (2006.01) | |
| *G21K 1/10* | (2006.01) | |
| *G01T 1/20* | (2006.01) | |
| *G01T 1/24* | (2006.01) | |
| *G01T 1/164* | (2006.01) | |

(52) U.S. Cl.
CPC .............. *G21K 1/10* (2013.01); *G01T 1/1648* (2013.01); *G01T 1/2002* (2013.01); *G01T 1/2018* (2013.01); *G01T 1/247* (2013.01); *G01T 7/00* (2013.01)

(58) Field of Classification Search
CPC ...................................................... G01T 7/00
See application file for complete search history.

(56) References Cited

U.S. PATENT DOCUMENTS

| | | |
|---|---|---|
| 4,827,136 A | 5/1989 | Bishop, Jr. et al. |
| 8,715,790 B2 | 5/2014 | Silva et al. |
| 2006/0081775 A1 | 4/2006 | Joyce et al. |
| 2007/0080299 A1 | 4/2007 | Endo et al. |
| 2009/0016580 A1 | 1/2009 | Yamamichi et al. |
| 2011/0262772 A1 | 10/2011 | Hauge et al. |
| 2012/0213994 A1 | 8/2012 | Jafry et al. |
| 2013/0134316 A1 | 5/2013 | Nakatsugawa et al. |
| 2014/0064454 A1 | 3/2014 | Hammond et al. |
| 2014/0161228 A1* | 6/2014 | Kitano ................... A61B 6/542 378/62 |
| 2014/0238477 A1 | 8/2014 | Fucinato |

(Continued)

FOREIGN PATENT DOCUMENTS

WO  WO 01/76228 A1  10/2001

OTHER PUBLICATIONS

John H. Lehman et al., "Far infrared thermal detectors for laser radiometry using a carbon nanotube array," Applied Optics, Jul. 20, 2011, pp. 4099-4101.

(Continued)

*Primary Examiner* — Yara B Green

(57) ABSTRACT

A curved radiographic detector has electromagnetic radiation sensitive elements disposed in a two-dimensional array. A curved housing encloses the two-dimensional array of radiation sensitive elements and includes a layer of aligned carbon nanotubes on a surface thereof.

20 Claims, 16 Drawing Sheets

(56) References Cited

U.S. PATENT DOCUMENTS

2015/0008330 A1    1/2015    MacLaughlin et al.

OTHER PUBLICATIONS

Kenneth K. S. Lau et al., "Superhydrophobic Carbon Nanotube Forests," American Chemical Society, Nano Letters, 2003, vol. 3, No. 12, pp. 1701-1705.
International Search Report for International Application No. PCT/US2016/033398 dated Sep. 5, 2016, 3 pages.
Lenntech, "Chemical elements listed by melting point," Retrieved from Internet url www.lenntech.com/periodic-chart-elements/melting-point.htm, 2016, 2 pages.
Ravi K. Joshi et al., "Assembly of one dimensional inorganic nanostructures into functional 2D and 3D architectures. Synthesis, arrangement and functionality," Chem Soc. Rev., 2012, 41, pp. 5285-5312.

\* cited by examiner

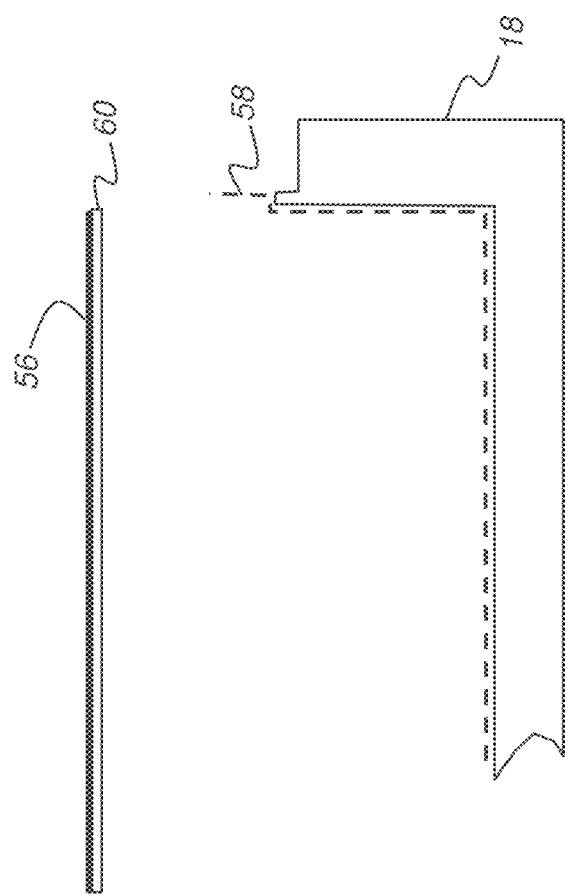

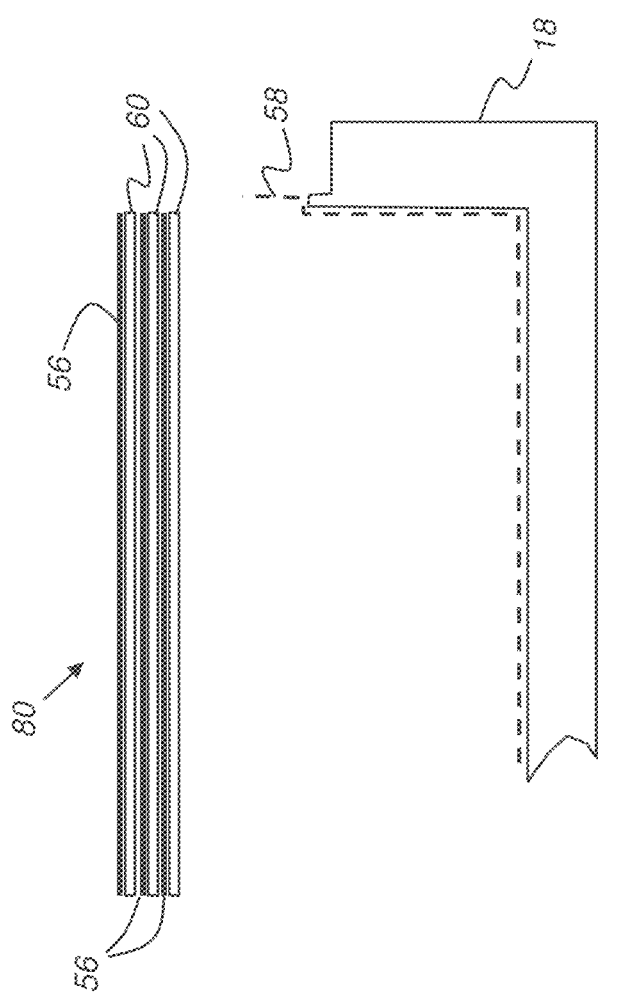

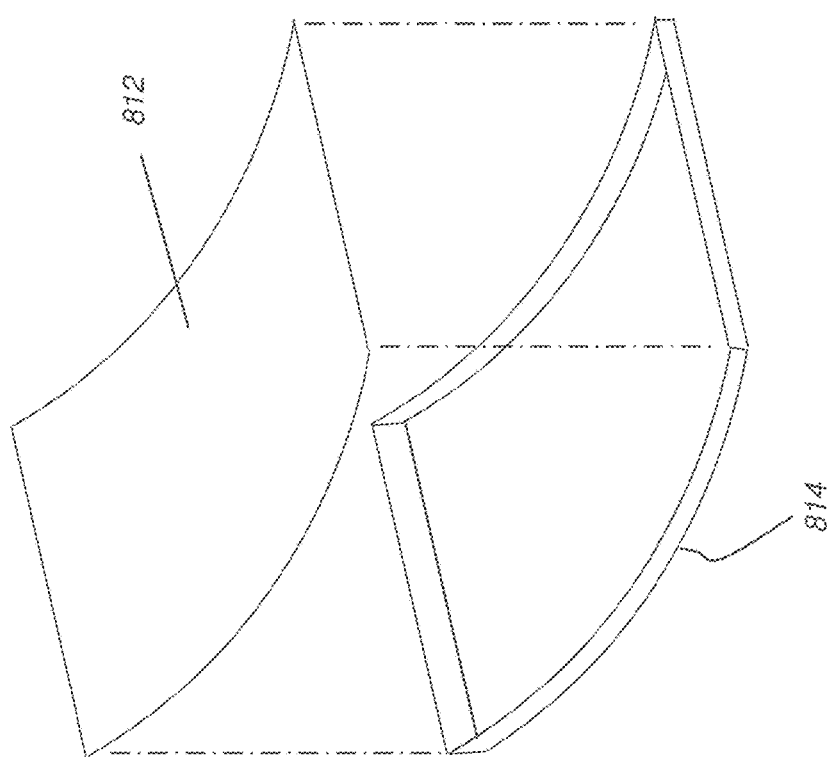

ALIGNED CARBON NANOTUBES FOR IMPROVED X-RAY DETECTOR PERFORMANCE

CROSS REFERENCE TO RELATED APPLICATIONS

This patent application is a continuation-in-part of U.S. patent application Ser. No. 14/811,871, filed Jul. 29, 2015, in the name of MacLaughlin, and entitled USE OF VERTICALLY ALIGNED CARBON NANOTUBE ARRAYS FOR IMPROVED X-RAY IMAGING DETECTOR PERFORMANCE.

FIELD OF THE INVENTION

The invention relates generally to the field of medical imaging and more particularly relates to apparatus and methods for treating an x-ray detector to reduce scattering of electromagnetic x-ray radiation.

BACKGROUND

Computed radiography (CR) and digital radiography (DR) imaging processes provide image content by converting received short wavelength x-ray energy to photoluminescent energy at higher spectral wavelengths, such as visible light energy. In CR, the energy from x-ray radiation is stored temporarily in a photostimulable storage phosphor medium for later release under an excitation light source and reading by an array of photodetectors. In DR, the energy from x-ray radiation can be converted directly to light energy as it is received; the emitted light energy from a scintillator layer in the DR device is then detected by a photodetector array that is adjacent to the scintillator layer.

Light scatter presents an obstacle to obtaining accurate pixellated data from either the CR storage phosphor plate or the DR detector scintillator layer. Some of the light energy that is stimulated from the light emitting material is not directed at angles that allow it to be directly sensed by detector circuitry, but radiates elsewhere within the image reading apparatus. This scattered light can contribute to image noise and degrade image contrast and overall image quality.

Various measures are taken to help prevent stray light from repeated reflection within the DR detector or CR reading apparatus, as well as to help keep ambient light from the detector circuitry. The image detection circuitry is typically protected from ambient light entry by design practices that provide covers, seals and gaskets, and other light-limiting features. Within the CR reading chamber or DR detector housing, non-reflective paints and coatings are typically provided, helping to absorb, rather than reflect, stray light from the photoluminescent materials themselves.

One inherent difficulty with any type of coated surface relates to reflectivity to electromagnetic radiation. Any smooth surface has been found to reflect light to some extent. Even light-absorbing paints and coatings exhibit some amount of reflection, unable to fully absorb incident light due to Fresnel reflection. By way of example, charcoal, normally considered to be a highly light-absorbent material, reflects as much as 4% of incident light. Even paints and coatings used for advanced aerospace imaging and measurement systems can exhibit reflectivity greater than about 0.5%. Within the confined space that is used for sensing stored or scintillated light from x-ray detectors, even very low levels of reflection can have a negative impact on image quality.

SUMMARY

A curved radiographic detector has electromagnetic radiation sensitive elements disposed in a curved two-dimensional array. A curved housing encloses the two-dimensional array of radiation sensitive elements and includes a layer of aligned carbon nanotubes on a surface thereof.

Certain exemplary embodiments of the application address the need for reduction of reflection and of consequent scattered light levels for CR image readers and DR detection devices. Advantageously, embodiments of the application can help to suppress scattered light more effectively than with conventional coatings and without introducing problems that can result from various coatings processes, such as chemical outgassing or particle generation, for example. Various embodiments can also provide a light-absorbent coating that is physically robust and that can withstand contact and handling during device fabrication, assembly, and operation.

These objects are given only by way of illustrative example, and such objects may be exemplary of one or more embodiments of the invention.

Other desirable objectives and advantages inherently achieved by the may occur or become apparent to those skilled in the art. The invention is defined by the appended claims.

According to one aspect of the disclosure, there is provided a curved radiographic imaging device comprising a plurality of electromagnetic radiation sensitive elements disposed in a curved two-dimensional array, a curved housing enclosing the curved two-dimensional array, and a layer of aligned carbon nanotubes on a curved surface of the housing.

According to another aspect of the disclosure, a method of assembling a curved radiographic detector includes assembling internal components of the curved radiographic detector, the internal components comprising a two-dimensional array of photoimaging pixels on a curved surface. A layer of aligned carbon nanotubes is applied to a portion of a first curved housing part. The first curved housing part is attached to a second curved housing part such that the portion of the first curved housing part faces a portion of the second curved housing part and the first and second curved housing parts form a curved enclosure surrounding the assembled internal components.

According to another aspect of the disclosure, a radiographic detector includes a curved recording medium that is energizable to generate a light output corresponding to an x-ray exposure. A curved housing encloses the curved recording medium during light output generation and comprises a curved surface facing the recording medium. A coating of aligned carbon nanotubes is coupled to the curved surface of the housing.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 4A is a side view that shows a foil having a CNT coating and conformable to the surface of a housing element.

FIG. 4B is a side view that shows a laminate having multiple CNT coatings for bonding to the surface of a housing element.

FIG. 8B is an exploded view that shows components of a digital radiography detector housing.

DESCRIPTION OF EXEMPLARY EMBODIMENTS

Figure 1:
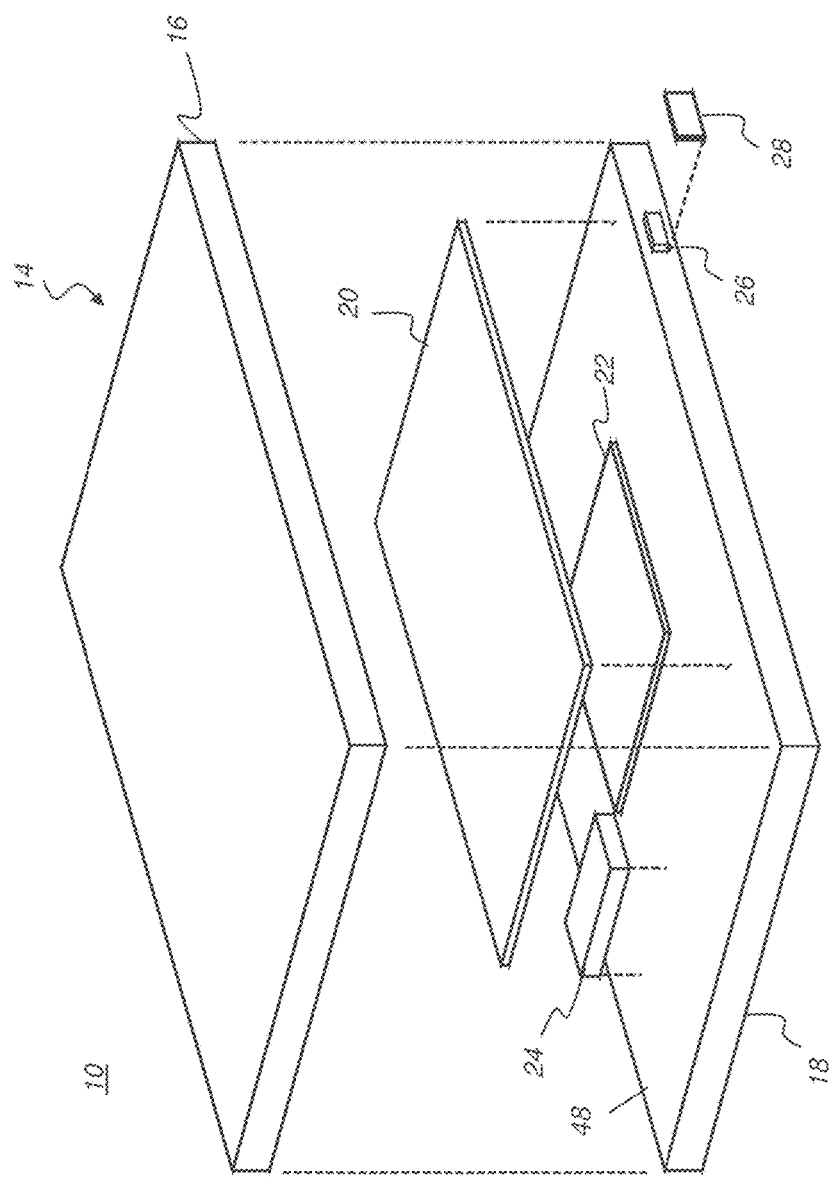
FIG. 1 is an exploded view that shows some of the components of a digital radiography (DR) detector.

The following is a description of exemplary embodiments, reference being made to the drawings in which the same reference numerals identify the same elements of structure in each of the several FIG.s.

Where they are used in the present disclosure, the terms "first", "second", and so on, do not necessarily denote any ordinal, sequential, or priority relation, but are simply used to more clearly distinguish one element or set of elements from another, unless specified otherwise.

As used herein, the term "energizable" relates to a device or set of components that perform an indicated function upon receiving power and, optionally, upon receiving an enabling signal.

The exploded view of FIG. 1 shows, in simplified form, some of the electrically active internal components of a DR detector 10 that are protected within an enclosure or housing 14 formed using multiple parts, including top and bottom housing covers 16 and 18. A detector array 20 includes a scintillator layer that generates output light energy when energized by an x-ray exposure, and a two-dimensional array of electromagnetic radiation sensitive elements for capturing the output light energy and generating image signals therefrom. A circuit board 22 provides supporting control electronics for processing the image signals, generating image data, and wirelessly transmitting the image data to an external host computer system. A chargeable and/or replaceable battery 24 provides power, acting as the voltage source for detector 10 operations. A port 26 extending through bottom cover 18 is provided to allow an alternative electrical wired connection for transmitting data, and for receiving power such as from a voltage supply, which voltage supply may also be used to charge the battery 24. The port may have an optional cover plate or sealing cap 28, which may be a rubber seal or other liquid-proof material. In addition to the illustrated components, a number of interconnecting cables, supporting fasteners, cushioning materials, connectors, and other elements may be used for packaging and protecting the DR detector circuitry. An optional antenna and transmitter for wireless communication may alternately be provided within or as part of the housing 14. Top and bottom housing covers 16 and 18 may be fastened together along a mating surface 48.

Figure 2A:
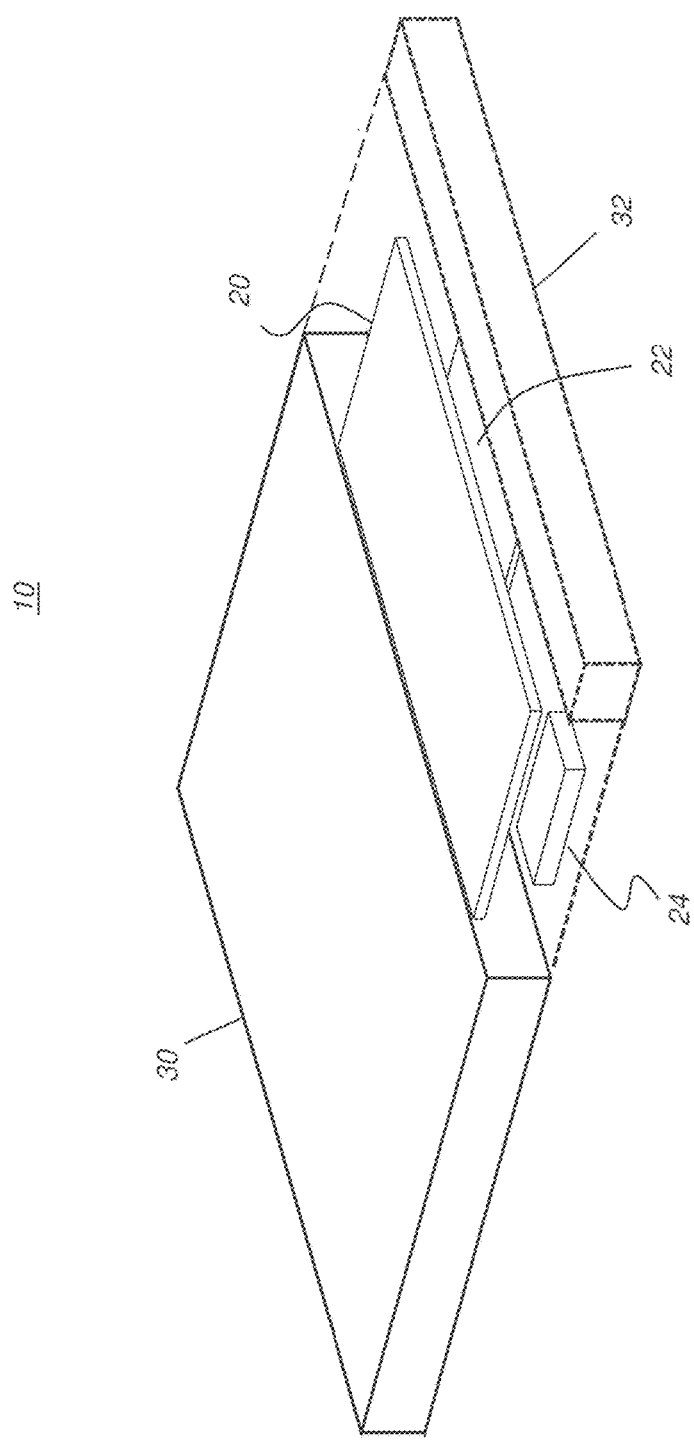
FIG. 2A is an exploded view that shows an alternate embodiment for DR detector packaging.

The exploded view of FIG. 2A shows an alternate embodiment of DR detector 10, in which detector array 20, circuit board 22, and battery 24, along with interconnection and other support components, slide into an encased cavity in an enclosure or housing 30 through an open end thereof. A lid 32 may be fastened to housing 30 to provide a protective seal.

Figure 2B:
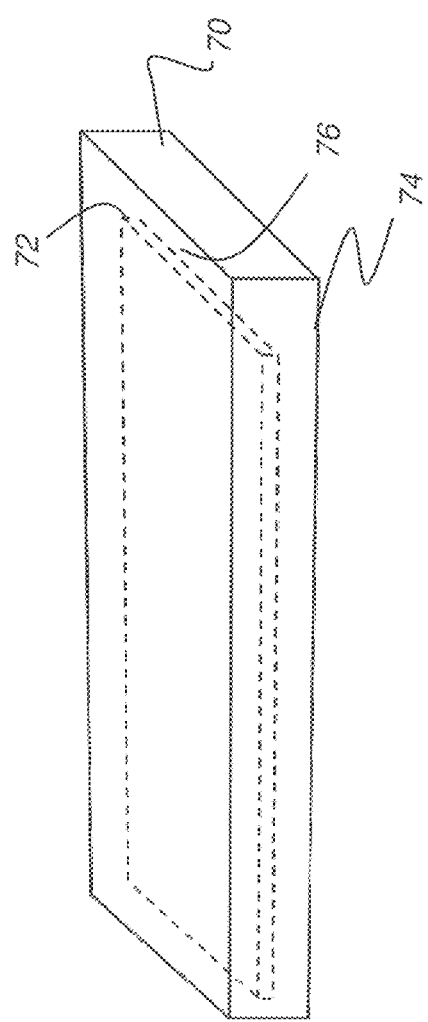
FIG. 2B shows a type of recording apparatus for computed radiography (CR) radiographic imaging.

FIG. 2B shows another type of recording apparatus for computed radiography (CR) radiographic imaging. A CR cassette 70 has a phosphor sheet 72 or plate that stores image information according to x-ray exposure; unlike the scintillator layer of detector array 20, phosphor sheet 72 stores exposure data for a finite time for later reading and erasure. A housing 74 encloses the recording medium during exposure and during transport to a reader device. Housing 74 includes planar or curved internal surfaces 76 that face the recording medium, phosphor sheet 72. Phosphor sheet 72 is energized by being exposed to electromagnetic energy of selected wavelengths, whereby different levels of the electromagnetic energy is locally retained by the energized phosphor, which is then digitally read out to provide the radiography image data.

Figure 2C:
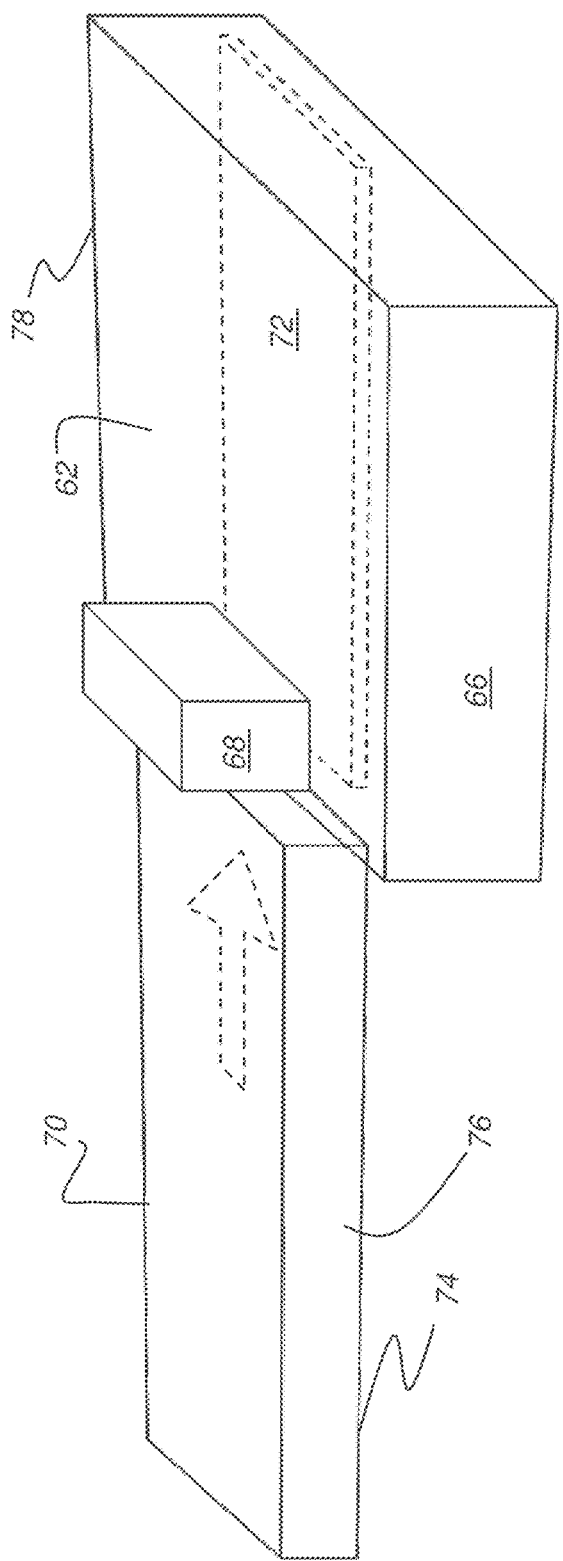
FIG. 2C is a schematic view that shows components of a CR reader apparatus for scanning the CR recording medium.

FIG. 2C shows yet another type of recording apparatus for CR imaging. A CR reader 66 briefly extracts phosphor sheet 72 from CR cassette 70 and routes the sheet 72 into a housing 78, past a scanner 68 that provides an excitation light to stimulate the storage phosphor on sheet 72 and thereby extract, or read out, locally retained radiography image data. Housing 78 has at least one internal planar or curved surface 62 that faces phosphor sheet 72 and that can therefore be subject to scattered light during the readout operation.

Embodiments of the present disclosure address the need for reducing scattered light reflection within the DR detector 10 or CR scanner using a coating provided by an array of one or more layers of aligned carbon nanotubes on at least one or more planar or curved surfaces of the housing, cassette, or scanner that face or surround the recording medium, either scintillator layer 40 (DR of FIG. 2A) or phosphor sheet 72 (CR of FIGS. 2B and 2C). Aligned carbon nanotubes (CNTs) provide a coating that can absorb nearly 100% of incident light, over the spectral range from ultraviolet (UV) to near-infrared (NIR) light having wavelengths ranging approximately from slightly below 380 nm to above 1000 nm.

Carbon nanotubes are formed as ordered arrangements of single layered carbon, also termed graphene, that are arranged in tubular fashion in any number of possible angles and curvatures, such as on a curved surface. Nanotube diameters can range from about 0.4 to 40 nm, with lengths variable, even exceeding several centimeters, allowing aspect ratios well above 1,000,000:1, for example. Single-walled carbon nanotubes can be considered as a graphene sheet that is rolled to a specific chiral angle with respect to a plane that is locally perpendicular to the CNT length. CNTs can be defined and specified by characteristics of diameter and chiral angle or by orientation of its component 6-member carbon ring. The angular arrangement of carbon atoms that form the CNT determine characteristic behavior of the CNT material, such as whether or not the CNT forms a conductor or semiconductor, for example. CNT structures are formed from single-walled graphene structures, but can be single-walled or multiple walled structures, such as where one narrower tube structure fits within a nanotube of larger radius. The structural arrangement that is provided can determine various performance characteristics, such as over what range radiant energy absorption is optimized, for example.

A number of light-absorbent paints and other coating materials are made having a percentage of CNT contents in their formulation. However, the CNT structures that are suspended in these coatings are in loose form and not aligned with each other, which makes these materials more susceptible to surface damage and limits their usefulness for reducing reflection. The CNTs of the present disclosure, however, are not loosely suspended in a coating solution, but have an aligned arrangement or vertically aligned form, as the term is understood and used by those skilled in the CNT fabrication arts. In aligned form, as the term implies, multiple CNT structures are formed in parallel to each other, extending outward vertically from a planar or curved surface and generally having height levels that are the same or vary within a narrow range.

CNTs may be grown on planar or curved substrate surfaces by a process that deposits a particulate catalyst on the surface, such as nickel, cobalt, or iron; provides a high temperature reducing atmosphere with a gaseous feedstock material that contains carbon, such as ethylene, ethanol, or methane; and applies a high energy such as a plasma to foster nanotube growth vertically upwards (away) from the metal catalyst sites on the planar or curved surface. Plasma assisted photo-thermal chemical vapor deposition (PTCVD) is one method that has been successfully used to generate aligned CNTs using this approach. Recent process improvements, such as those described in U.S. Pat. No. 8715790 to Silva et al., have helped to reduce the needed temperature conditions for CNT growth and allow CNTs to be formed onto aluminum and other metallic surfaces, which patent is hereby incorporated by reference in its entirety as if fully set forth herein. One arrangement of CNT, termed VANTAblack for Vertically Aligned NanoTube Arrays, provides the most highly light absorbent material known, absorbing up to 99.965% of light radiation over the spectral range from UV to NIR.

Figure 3A:
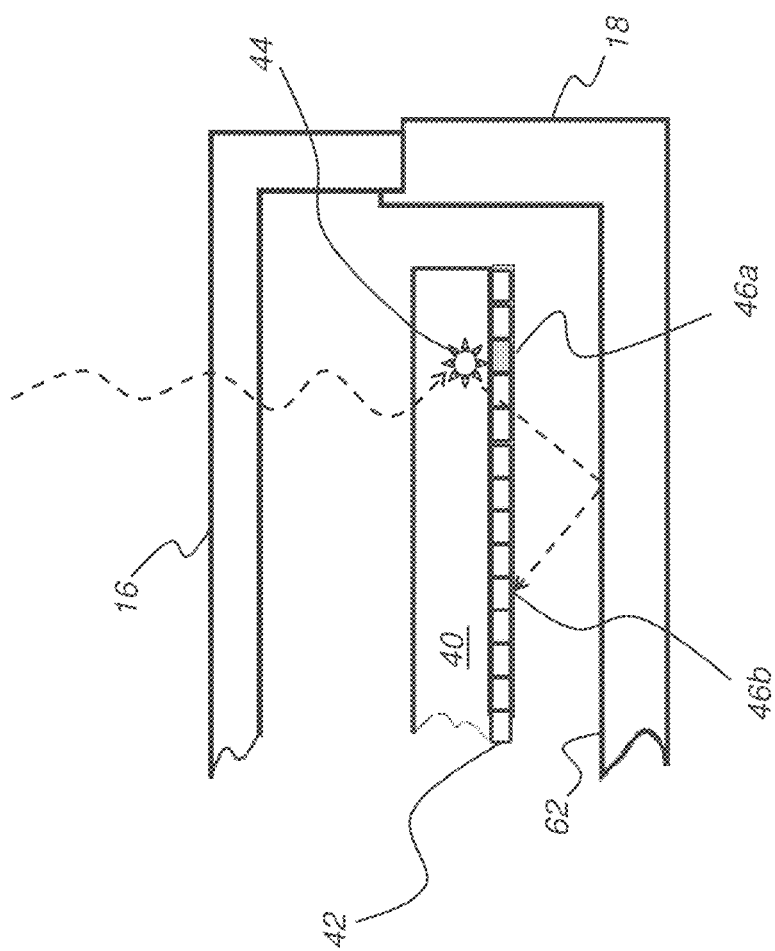
FIG. 3A is a side view that shows a portion of the DR detector to show light scattering.

FIG. 3A shows, from a cross-sectional side view, a small portion of DR detector 10 with aspects of detector 20 circuitry. Detector 20 has a scintillator layer 40 and a photodiode array 42. X-ray radiation excites scintillator material 44, causing a localized release of light energy. Most of the emitted light impacts photodiode 46a, as intended, so that the energy level of the signal at photodiode 46a corresponds to the intensity of the x-ray energy that is received at the scintillator material 44. Some of the light, however, is scattered and is reflected from an internal surface 62 of the housing toward a photodiode 46b, effectively adding noise to photodiode 46b. Such scattering may occur at various locations within the assembled housing portions 16, 18, and impact various ones of the photodiodes in photodiode array 42.

Figure 3B:
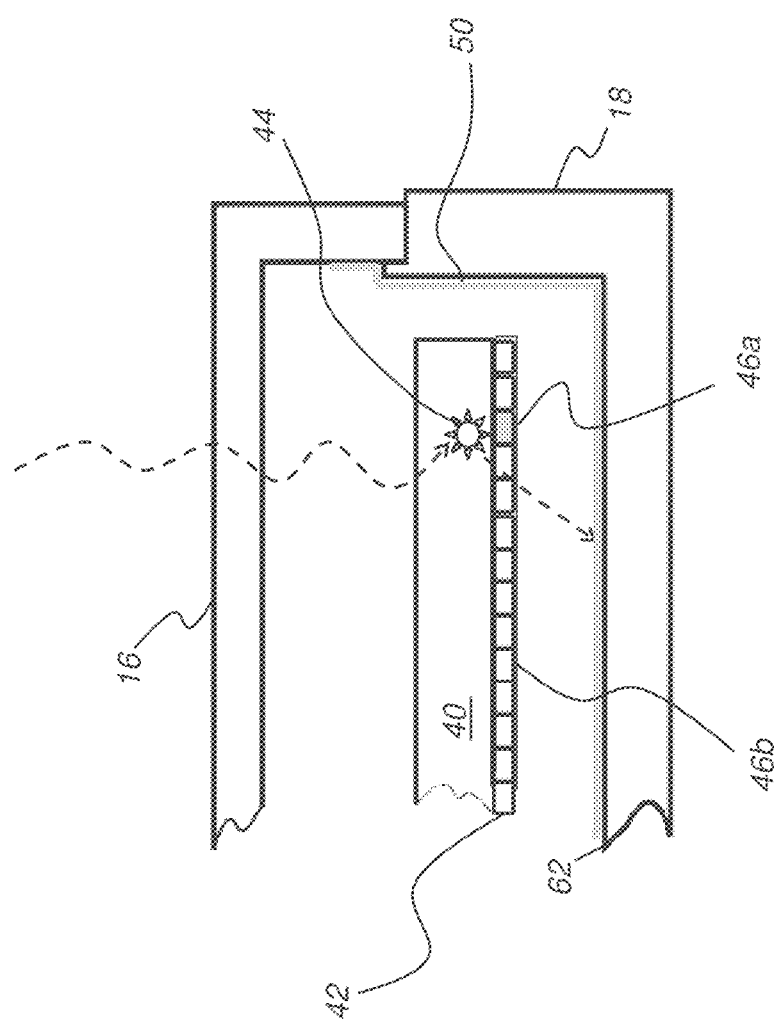
FIG. 3B is a side view that shows the DR detector with a light-absorbing CNT coating.

FIG. 3B shows CNTs deposited onto one or more curved or planar surfaces 62 of the DR detector housing portion 18. CNTs may be deposited as a layer 50 over at least portions of internal curved or planar surfaces of the DR detector. Stray light is thereby absorbed by the CNT material. VANTA materials can be formed onto the internal surfaces of housing 14 or onto surfaces that are most likely to receive incident light, such as surfaces nearest scintillator materials or areas that are close to seams, connectors, and other features through which ambient light can penetrate.

CNT regions can also be formed to suppress reflection from internal surfaces of a CR reader. There are a number of types of CR plate readers and scanning apparatus that provide excitation light to the photostimulable phosphor in order to extract the stored image data after an x-ray exposure. Inner portions of the CR cassette can also be provided with CNT coatings.

Unlike other types of coatings, CNT arrays are grown on the target curved or planar surface, requiring processing under controlled vacuum and heat conditions that may not be compatible with all materials or components used for the DR detector or within the CR cassette or reader. There can be practical considerations that relate to which regions of a surface benefit most from CNT formation.

Because CNT features can be formed having different heights, diameters, and number of walls within which tubes are formed, some spectral tuning is available in the nanotube fabrication process. Thus, for example, light absorption may be optimized to target different wavelengths of the electromagnetic spectrum. A number of filtering effects may be provided, forming CNT arrays that have different spectral characteristics in different regions of the DR detector, for example.

Figure 3C:
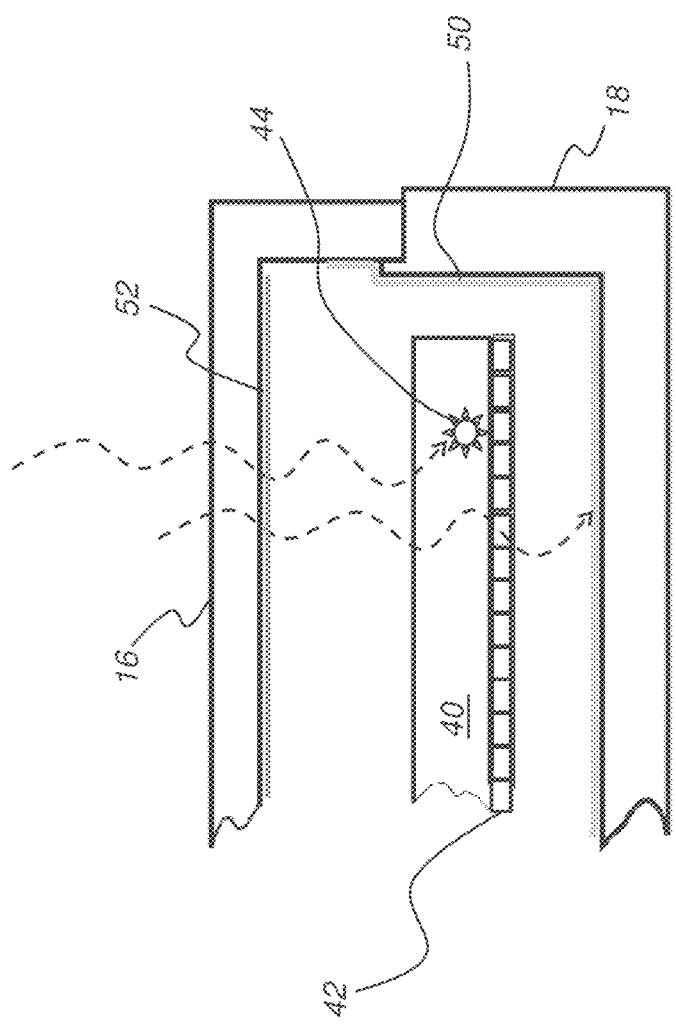
FIG. 3C is a side view that shows the DR detector with a second light-absorbing CNT coating, wherein the first CNT coating is x-ray absorbent.

According to an embodiment of the present disclosure, a CNT array is formed with nanotube structures that can be "tuned", that is, designed to be spectrally selective, providing different amounts of transmission or absorption for incident electromagnetic energy according to its wavelength. Thus, for example, CNT structures can be formed that absorb light wavelengths in visible or near-visible range, such as energy emitted from the scintillator layer or storage phosphor material of the x-ray detector, but transmit x-rays with little or no perceptible absorption. The schematic side view of FIG. 3C shows an embodiment of a DR detector that has an additional layer 52 that is transmissive of x-ray energy but absorbs visible light or light in the NIR-UV range.

Conversely, CNT structures that transmit light in the range from UV to IR wavelengths, but absorb at least some amounts of x-ray radiation, may also be formed. Referring again to FIG. 3C, layer 50 is optimized for x-ray absorption and may or may not be absorbent of light energy at other wavelengths. In this way, CNT layers can be used to form selective filters that can be used on one or more surfaces within a DR detector or CR storage or reading apparatus.

Figure 3D:
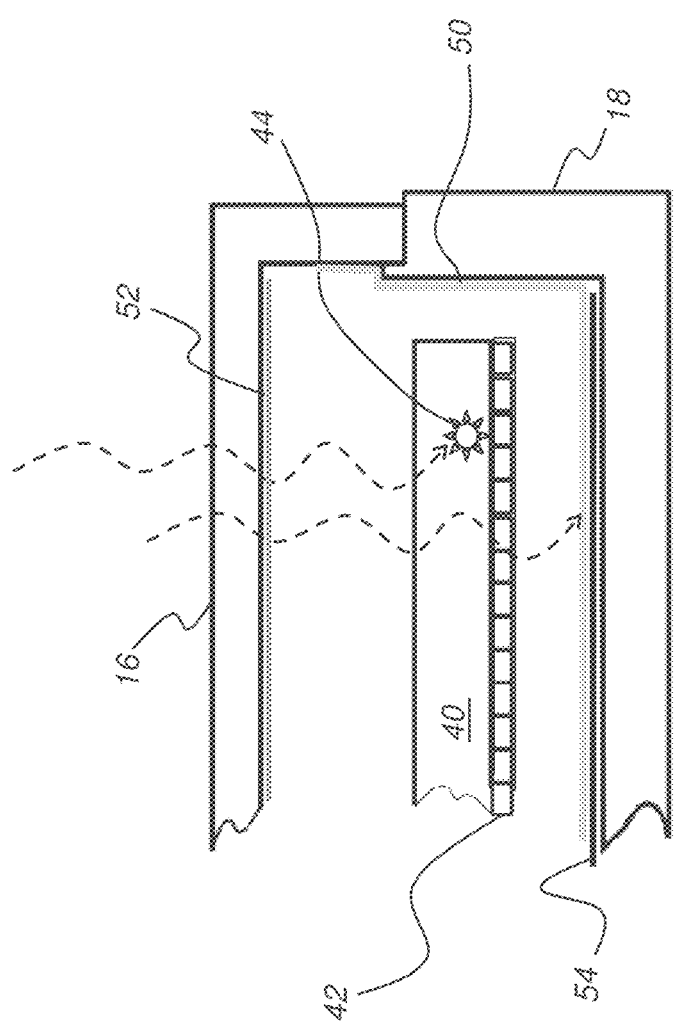
FIG. 3D is a side view that shows the DR detector wherein the CNT coating supplements the x-ray blocking of a lead shield layer.

According to an embodiment of the present disclosure, an aligned CNT array is formed having high absorption for x-ray radiation. This arrangement allows one or more lightweight CNT layers to substitute for some or all of the lead shielding that may otherwise be used in the DR detector. There is a consequent reduction in weight in this embodiment, due to reducing the amount of lead that is required. Similar improvements in the weight of CR detectors and other equipment can also be realized using this feature. FIG. 3D shows an embodiment of the present disclosure in which layer 50 provides a measure of x-ray absorption, but is not sufficiently absorptive to meet requirements for the DR device. An additional layer 54 of lead or other highly dense material is used to supplement the absorption that is provided from layer 50. However, because layer 50 provides at least some absorption, layer 54 can be reduced in thickness over conventional applications and so provide reduced weight advantages.

According to an embodiment of the present disclosure, multiple layers of CNT arrays are combined in order to provide filtering effects or allow other more complex absorption characteristics. Thus, for example, with respect to FIG. 3D, layer 50 can be a composite structure, having a combination of component layers, each having CNT features that provide a particular energy absorption characteristic.

Although arrays of carbon nanotubes can be formed at relatively low temperatures, there are still some limitations related to the types of materials on which a CNT coating can be formed. Plastics, for example, may not withstand the needed temperature levels for CNT growth and application. For such materials, one method that may be used is coating an intermediate material, then adhering or otherwise coupling the CNT-coated intermediate material onto the plastic or other material. Referring to FIG. 4A, a foil is coated as an intermediate sheet 60 with a CNT layer 56. Foil used as intermediate sheet 60 can be an aluminum foil, for example. The CNT coating renders an aluminum foil surface to be very highly absorbent, making it difficult to discern surface creases and irregularities, for example. The coated foil or other sheet 60 can then be adhered or otherwise bonded or coupled to housing cover portion 18 and conformed to a desired form 58 shown in dashed line form, for example. One or both sides of foil 60 or other intermediate material can be coated with a CNT array, as needed.

Referring to the exploded view shown in FIG. 4B, multiple coated layers of foil or other intermediate sheet 60 material can be fitted and bonded together to form a laminate 80 having multiple layers of vertically aligned carbon nanotube arrays. Each CNT layer 56 can be individually configured to absorb a particular set of electromagnetic wavelengths that may or may not overlap. The laminate can then be bonded to a surface of a CR or DR detector or other component.

Figure 5:
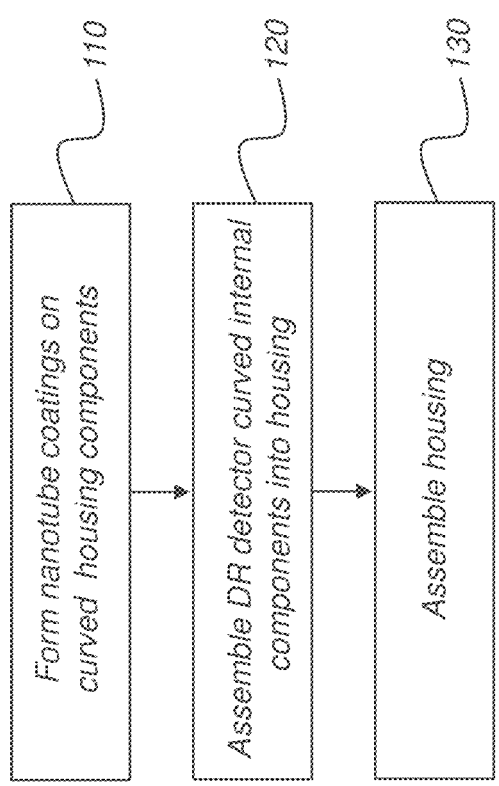
FIG. 5 shows steps in a workflow for assembling a radiographic detector according to an embodiment of the present disclosure.

The flow diagram of FIG. 5 shows a sequence for assembling a planar or curved radiographic detector according to an embodiment of the present disclosure. In a coating step 110, at least one layer of aligned carbon nanotubes is applied to a portion of a first curved housing part. Step 110 can be performed by forming the carbon nanotubes on the housing part itself, under the appropriate energy, temperature, and pressure conditions, or on an intermediate that is conformed to the curved shape of the housing part, as described with reference to the example of FIG. 4A. In a component assembly step 120, curved internal components of the radiographic detector are assembled, as described with reference to FIG. 1. The internal curved components include at least an array of photoimaging pixels. In a housing assembly step 130, the curved housing covers or other housing parts are attached to each other to form an assembled curved housing. Covers attached to each other form a curved enclosure surrounding the assembled internal components. Portions of the first housing part and second housing part can be at least partially abutted against each other.

Figure 6:
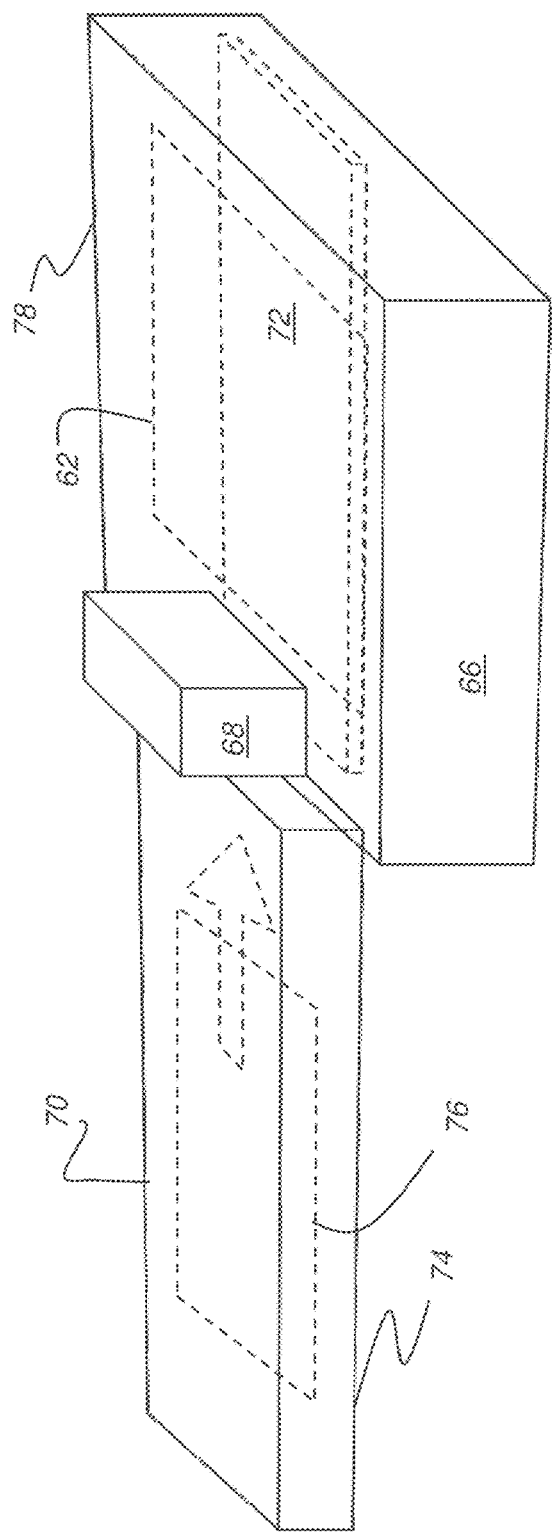
FIG. 6 is a schematic diagram that shows coatings used for a CR reader.

FIG. 6 is a schematic diagram that shows CNT coatings used for a CR reader. Within housing 74, a first coating formed from a CNT array is provided on surface 76. This can be an x-ray absorptive coating, for example. Within housing 78 of CR reader 66, a second coating formed as a CNT array is provided on surface 62. This can be a coating that is designed to absorb visible light or electromagnetic energy that is used to energize the storage phosphor during image scanning (readout).

Figure 7:
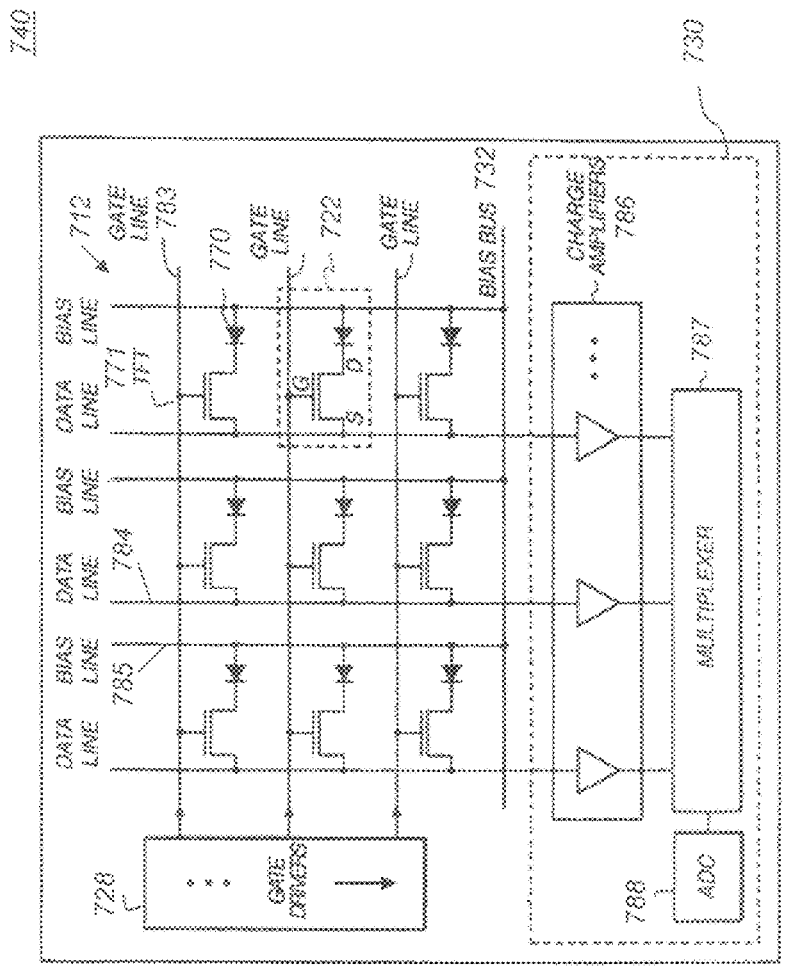
FIG. 7 is a schematic diagram of a two dimensional array of photosensors

FIG. 7 is a schematic diagram 740 of a portion of a two-dimensional curved array of photosensors 712 usable with a curved DR detector such as the DR detectors described herein. The array of photosensors 712 may include a number of hydrogenated amorphous silicon (a-Si:H) n-i-p photodiodes 770 and thin film transistors (TFTs) 771 formed as field effect transistors (FETs) each having gate (G), source (S), and drain (D) terminals. In embodiments of a DR detector disclosed herein, such as a multilayer DR detector (900 of FIG. 9), the two-dimensional array of photosensor cells 712 may be formed in a device layer that abuts adjacent layers of the DR detector structure, which adjacent layers may include a flexible polyimide layer, that may be shaped in a curved orientation, or including a curved carbon fiber layer. A plurality of gate driver circuits 728 may be electrically connected to a plurality of gate lines 783 which control a voltage applied to the gates of TFTs 771, a plurality of readout circuits 730 may be electrically connected to data lines 784, and a plurality of bias lines 785 may be electrically connected to a bias line bus or a variable bias reference voltage line 732 which controls a voltage applied to the photodiodes 770. Charge amplifiers 786 may be electrically connected to the data lines 784 to receive signals therefrom. Outputs from the charge amplifiers 786 may be electrically connected to a multiplexer 787, such as an analog multiplexer, then to an analog-to-digital converter (ADC) 788, or they may be directly connected to the ADC, to stream out the digital radiographic image data at desired rates. In one embodiment, the schematic diagram of FIG. 7 may represent a portion of a DR detector such as an a-Si:H based indirect curved panel or flexible panel imager.

Incident x-rays, or x-ray photons, are converted to optical photons, or light rays, by a scintillator, which light rays are subsequently converted to charges upon impacting the a-Si:H n-i-p photodiodes 770. In one embodiment, an exemplary detector cell 722, which may be equivalently referred to herein as a photosensor, may include a photodiode 770 having its anode electrically connected to a bias line 785 and its cathode electrically connected to the drain (D) of TFT 771. The bias reference voltage line 732 can control a bias voltage of the photodiodes 770 at each of the detector cells 722. The charge capacity of each of the photodiodes 770 is a function of its bias voltage and its capacitance. In general, a reverse bias voltage, e.g. a negative voltage, may be applied to the bias lines 785 to create an electric field (and hence a depletion region) across the pn junction of each of the photodiodes 770 to enhance its collection efficiency for the charges generated by incident light rays. The image signal represented by the array of photosensor cells 712 may be integrated by the photodiodes while their associated TFTs 771 are held in a non-conducting (off) state, for example, by maintaining the gate lines 783 at a negative voltage via the gate driver circuits 728. The photosensor cell array 712 may be read out by sequentially switching rows of the TFTs 771 to a conducting (on) state by means of the gate driver circuits 728. When a row of the photosensors 722 is switched to a conducting state, for example by applying a positive voltage to the corresponding gate line 783, collected charge from the photodiode in those photosensors may be transferred along data lines 784 and integrated by the external charge amplifier circuits 786. The row may then be switched back to a non-conducting state, and the process is repeated for each row until the entire array of photosensors 712 has been read out. The integrated signal outputs are transferred from the external charge amplifiers 786 to an analog-to-digital converter (ADC) 788 using a parallel-to-serial converter, such as multiplexer 787, which together comprise read-out circuit 730.

This digital image information may be subsequently processed by a processing system to yield a radiographic digital image which may then be digitally stored and immediately displayed, or it may be displayed at a later time by accessing a digital electronic memory of the processing system containing the stored image. The curved DR detector having an imaging array as described with reference to FIG. 7 may be capable of both single-shot (e.g., static, radiographic) and continuous rapid image acquisition.

Figure 8A:
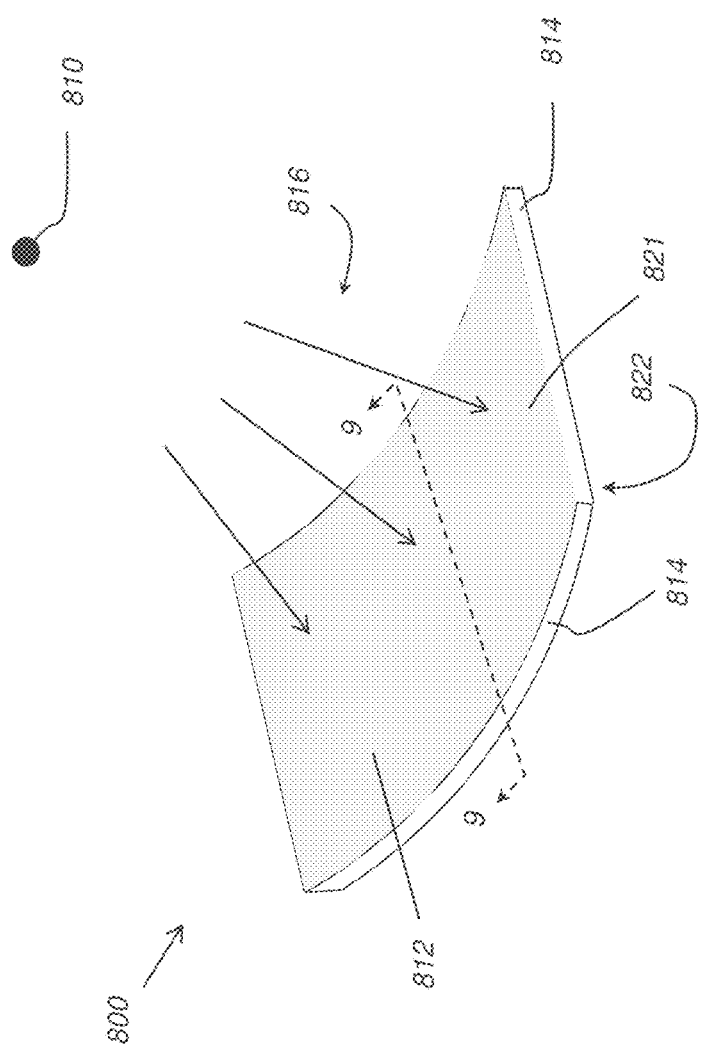
FIG. 8A shows a perspective view of an exemplary curved DR detector.
Figure 9:
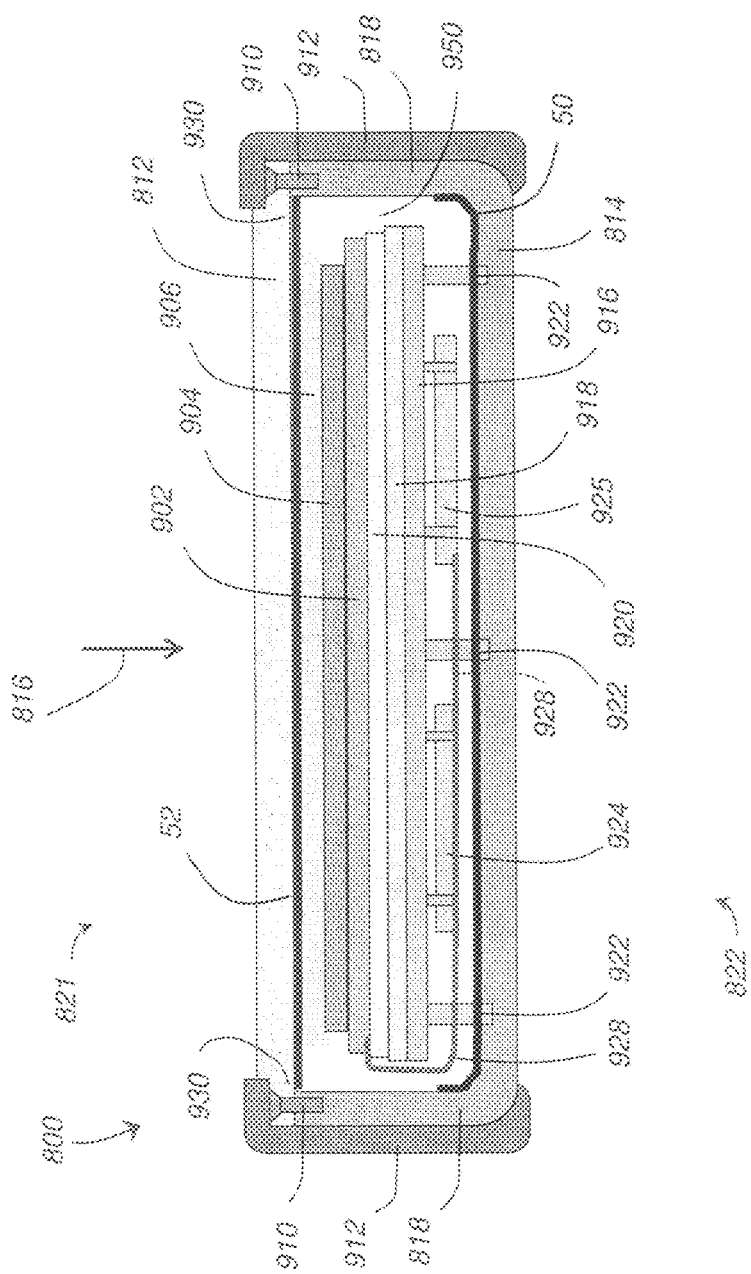
FIG. 9 shows a cross-section view of the curved DR detector of FIG. 8A.

FIGS. 8A and B through FIG. 9 show a perspective view and cross-section view, respectively, of an exemplary curved portable wireless DR detector 800 according to an embodiment of the DR detectors disclosed herein. The DR detector 800 may include a permanently fixed curved substrate or a flexible substrate that may be shaped into a curve to allow the DR detector 800 to capture radiographic images in a curved orientation. The substrate may be fabricated in a permanent curved orientation along one or two dimensions, or it may remain flexible throughout its life to provide an adjustable curvature along the one or two dimensions, as desired.

The DR detector 800 may include a similarly permanently curved or flexible housing portion 814 that partially surrounds a curved or flexible multilayer structure comprising a curved or flexible array of photosensors 722 of the DR detector 800. The permanently curved or flexible housing portion 822 may be formed as a single-piece integrally formed, permanently curved or flexible tray 814. The housing portion 814 of the DR detector 800 may include a continuous, curved or flexible, radiopaque material, surrounding an interior volume 950 (FIG. 9) of the DR detector 800. The housing portion 814 may include four perpendicular side edges 818 (FIG. 9) of which any two opposing side edges 818 or all four side edges 818 may be formed as curved or flexible side edges 818 depending on whether the DR detector 800 is made to be curved or flexible along one or two dimensions. The curved or flexible side edges 818 may extend between the top side 821 and the bottom side 822, and arranged substantially orthogonally in relation to the top and bottom sides 821, 822. The bottom side 822 of the housing portion 814 may be fabricated to be continuous with the four side edges 818, thereby forming the solid five-sided tray. The side edges 818 may be formed as separate portions and attached to the bottom side 822 of the housing portion 814. The bottom side 822 is disposed opposite the top side 821 of the DR detector 800, which top side 821 may be formed to function as a top cover 812 in contact with the four side edges 818 to complete an enclosure of the interior volume 950. The top cover 812 attached to the housing side edges 818 substantially encloses the curved multilayer structure in the interior volume 950 of the DR detector 800. The top cover 812 may be attached to the housing side edges 818 to form a seal therebetween, and be made of a radiolucent material that passes x-rays 816 without significant attenuation thereof, such as a carbon fiber plastic, polymeric, or other plastic based material.

The x-rays 816 may be emitted at a focal point 810 of an x-ray source disposed at an appropriate distance above the top side 821. The curved DR detector 800 may include a curvature such that the emitted x-rays 816 impact each of the photosensors at an angle that is closer to a perpendicular (90°) angle for more of the photosensors as compared to using a planar panel detector. Similarly, the distance between the focal point 810 and each photosensor in the DR detector array 712 is less varied compared to using a planar panel detector. In particular, such a curved detector 800 may be advantageously used in a CBCT imaging system having a radial distance between an imaging axis and the DR detector.

The exploded view of FIG. 8B shows, in simplified form, the enclosure or housing formed using multiple parts, including top and bottom housing portions 812 and 814. The curved detector array portions described herein may be positioned within the bottom portion 814 and enclosed by top cover 812.

With reference to the exemplary cross-section view of FIG. 9, along section 9-9 of the exemplary DR detector 800 shown in FIG. 8A, one major surface of the DR detector 800 may be referred to as the top side 821 opposite a second major surface referred to herein as the bottom side 822. The imaging components described herein may be disposed within the interior volume 950 enclosed by the housing 814 with side edges 818 and top cover 812, and may include a curved or flexible scintillator layer 904 over a curved or flexible two-dimensional array of photosensors shown schematically as a device layer 902. The scintillator layer 904 may be directly under (e.g., in direct contact with) the curved or flexible top cover 812, and the imaging array 902 may be directly under the scintillator 904. Alternatively, a flexible layer 906, as shown in FIG. 9, may be positioned between the scintillator layer 904 and the top cover 812 as part of the multilayer structure to allow adjustable curvature of the multilayer structure and/or to provide shock absorption. The flexible layer 906 may be selected to provide an amount of flexible support for both the top cover 812 and the scintillator 904, and may comprise a foam rubber type of material. The layers just described comprising the multilayer structure each may generally be formed in a curved or flexible rectangular shape and disposed in parallel with the planes of the top and bottom sides 821, 822, and in parallel with the side edges 818, as described herein.

The curved or flexible substrate layer 920, such as a curved or flexible polyimide or carbon fiber layer, may be disposed under the imaging array 902. Under the substrate layer 920 a radiopaque shield layer 918 may be used as an x-ray blocking layer to help prevent scattering of x-rays passing through the substrate layer 920 as well as to block x-rays reflected from other surfaces present in the interior volume 950. Readout electronics 924, 925, including the read out circuits described in relation to FIG. 11 may be formed adjacent the imaging array 902 or, as shown, may be disposed below frame support member 916 in the form of small integrated circuits (ICs) 924, 925 electrically connected to printed circuit substrates. The imaging array 902 may be electrically connected to the readout electronics 924, 925 (ICs) using a flexible electrical connector 928 which may comprise a plurality of flexible, sealed conductors known as chip-on-film (COF) connectors.

X-ray flux may pass through the radiolucent top cover 812, in the direction represented by an exemplary x-ray beam 816, and impinge upon scintillator 904 where stimulation by the high-energy x-rays 816, or photons, causes the scintillator 904 to emit lower energy photons as visible light rays which are then received in the photosensors of imaging array 902. The frame support member 916 may connect the multilayer structure to the housing 814 and may further operate as a shock absorber between the frame supports 922 and the multilayer structure. Fasteners 910 may be used to attach the top cover 812 to the housing side edges 818 and create a seal therebetween in the region 930 where they come into contact. In one embodiment, external bumpers 912 may be attached to the side edges 818 along their length, as shown, or the external bumpers 912 may be attached only to the corners of the DR detector 800 to provide additional shock-absorption.

As described herein, such as in relation to FIG. 3C, a CNT layer 50 may be deposited as a layer 50 over at least portions of internal curved surfaces of housing 814 of the DR detector 800. An additional CNT layer 52 may also be applied to an interior surface of the top cover 812, if desired. The additional layer 52 may be transmissive of x-ray energy but absorbs visible light or light in the NIR-UV range. Stray light is thereby absorbed by the CNT material as described herein. Layer 50 may be optimized for x-ray absorption and may or may not be absorbent of light energy at other wavelengths. In this way, CNT layers can be used to form selective filters that can be used on one or more surfaces within DR detector 800. As described herein with reference to the exploded view shown in FIG. 4B, multiple coated layers of foil or other intermediate sheet 60 material can be fitted and bonded together to form a laminate 80 having multiple layers of vertically aligned carbon nanotube arrays and applied to the interior surfaces of the top and bottom portions 812, 814. The laminate may be bonded to other interior surface of the DR detector 800, as desired.

Advantageously, the use of nanotechnology and coatings with substantial nanoparticulate content can reduce the weight of the DR detector and can help to eliminate at least a portion of seals, gaskets, conventional coatings, and other preventive devices and treatments that have previously been used for protection of DR detectors from ambient and scattered light. These CNT coatings can withstand heat, cleaning, and abrasion, and allow disassembly of the DR detector, such as for battery replacement, upgrade, or repair, for example.

What is claimed:

1. A curved radiographic detector comprising:
a plurality of electromagnetic radiation sensitive elements disposed in a curved two-dimensional array;
a curved housing enclosing the two-dimensional array of radiation sensitive elements; and
a layer of aligned carbon nanotubes on a surface of the housing.

2. The device of claim 1, wherein the radiation sensitive elements comprise a photostimulable material that reacts to electromagnetic radiation within a spectrum of wavelengths that includes visible light wavelengths.

3. The device of claim 2, wherein the carbon nanotubes are vertically aligned in a direction orthogonal to a curved surface of the housing.

4. The device of claim 2, wherein the detector is configured to be placed in a computed radiography reader to digitize the array of radiation sensitive elements.

5. The device of claim 1, wherein the radiation sensitive elements comprise a photostimulable material that is configured to be energized by electromagnetic radiation within a spectrum of wavelengths that includes ionizing wavelengths and to remain energized for a finite time.

6. The device of claim 5, wherein the detector is configured to be placed in a computed radiography reader to digitize the array of radiation sensitive elements within the finite time.

7. The device of claim 1, wherein the radiographic detector comprises a digital radiation detector, and wherein the radiation sensitive elements each comprise a photosensitive pixel controllably connected to an electronic memory through a readout switch.

8. The device of claim 7, wherein the readout switch comprises a thin film transistor and the photosensitive pixel comprises a photosensitive diode.

9. The device of claim 1, wherein the surface of the housing comprises aluminum.

10. The device of claim 1, wherein the housing comprises a material having a melting point of about 450° C. or greater.

11. A method of assembling a radiographic detector, the method comprising:
assembling internal components of the radiographic detector, the internal components comprising a two-dimensional array of photoimaging pixels on a curved surface;
applying a layer of aligned carbon nanotubes to a portion of a first curved housing part; and
attaching the first curved housing part to a second curved housing part such that the portion of the first curved housing part faces a portion of the second curved housing part and the first and second curved housing parts form a curved enclosure surrounding the assembled internal components.

12. The method of claim 11, further comprising applying a layer of the aligned carbon nanotubes to the portion of the second curved housing part.

13. The method of claim 12, further comprising at least partially abutting the portion of the first curved housing part against the portion of the second curved housing part.

14. A radiographic image recording apparatus comprising:
a curved recording medium that is energizable to generate a light output corresponding to an x-ray exposure;
a curved housing that encloses the curved recording medium during light output generation and that comprises at least one curved surface facing the recording medium; and
a coating of aligned carbon nanotubes coupled to the at least one curved surface of the housing.

15. The apparatus of claim 14 wherein the recording medium comprises a storage phosphor of a computed radiography cassette.

16. The apparatus of claim 14 wherein the recording medium comprises a scintillator layer of a digital radiography detector.

17. The apparatus of claim 14 wherein the coating absorbs x-ray energy.

18. The apparatus of claim 14 wherein the coating absorbs visible light energy.

19. The apparatus of claim 14 wherein the coating is formed on an intermediate curved sheet attached to the at least one curved surface of the housing.

20. The apparatus of claim 14 wherein the coating comprises a laminate having two or more layers of the aligned carbon nanotubes.

* * * * *